(12) United States Patent
Rayner (10) Patent No.: US 10,021,350 B2
(45) Date of Patent: Jul. 10, 2018

(54) AUTOMATED PERSONNEL SCREENING SYSTEM AND METHOD

(71) Applicant: Rapiscan Systems, Inc., Torrance, CA (US)

(72) Inventor: Timothy James Rayner, Sussex (GB)

(73) Assignee: Rapiscan Systems, Inc., Torrance, CA (US)

( * ) Notice: Subject to any disclaimer, the term of this patent is extended or adjusted under 35 U.S.C. 154(b) by 842 days.

(21) Appl. No.: 14/280,774

(22) Filed: May 19, 2014

(65) Prior Publication Data

US 2015/0054931 A1   Feb. 26, 2015

Related U.S. Application Data

(63) Continuation of application No. 12/888,412, filed on Sep. 23, 2010, now Pat. No. 8,766,764.

(51) Int. Cl.
| | |
|---|---|
| *H04N 7/18* | (2006.01) |
| *G05B 15/02* | (2006.01) |
| *G06T 7/00* | (2017.01) |
| *E05F 15/70* | (2015.01) |
| *E05F 15/72* | (2015.01) |
| *E05F 15/76* | (2015.01) |

(52) U.S. Cl.
CPC ............... *H04N 7/18* (2013.01); *E05F 15/70* (2015.01); *E05F 15/72* (2015.01); *E05F 15/76* (2015.01); *G05B 15/02* (2013.01); *G06T 7/00* (2013.01); *G06T 2207/10116* (2013.01); *G06T 2207/30232* (2013.01)

(58) Field of Classification Search
CPC ....... E05F 15/2046; E05F 15/70; E05F 15/72; E05F 15/76; G05B 15/02; G06T 7/00; G06T 2207/10116; G06T 2207/30232; H04N 7/18
See application file for complete search history.

(56) References Cited

U.S. PATENT DOCUMENTS

| | | | |
|---|---|---|---|
| 4,060,935 A * | 12/1977 | Miller | ................ E05G 5/02 49/25 |
| 4,586,441 A | 5/1986 | Zekich | |
| 4,711,994 A | 12/1987 | Greenberg | |

(Continued)

FOREIGN PATENT DOCUMENTS

| | | |
|---|---|---|
| EP | 1972932 A1 | 9/2008 |
| EP | 2619558 A1 | 7/2013 |
| JP | 2004069576 A | 3/2004 |

OTHER PUBLICATIONS

International Search Report for PCT/US06/00623, dated Feb. 27, 2008, International Search Authority, pp. 12-13 of the report analyzes the materiality of certain references.

(Continued)

*Primary Examiner* — James Yang (74) *Attorney, Agent, or Firm* — Novel IP (57) ABSTRACT

The present specification discloses a system for controlling a movement of at least one person into a controlled location. The system includes an X-ray screening system having an entrance area defined by walls and a gate, and an exit area defined by walls and a gate. The gates are automatically controlled based upon the output of the X-ray screening system. Additional gates, defining an additional holding area, are used for subsequent analysis and inspection.

10 Claims, 6 Drawing Sheets

(56) References Cited

U.S. PATENT DOCUMENTS

| | | |
|---|---|---|
| 5,181,234 A | 1/1993 | Smith |
| 5,490,218 A | 2/1996 | Krug |
| 5,503,424 A | 4/1996 | Agopian |
| 5,600,303 A | 2/1997 | Husseiny |
| 5,692,029 A | 11/1997 | Husseiny |
| 5,838,758 A | 11/1998 | Krug |
| 5,930,326 A | 7/1999 | Rothschild |
| 5,940,468 A | 8/1999 | Huang |
| 6,081,580 A | 6/2000 | Grodzins |
| 6,094,472 A | 7/2000 | Smith |
| 6,151,381 A | 11/2000 | Grodzins |
| 6,192,104 B1 | 2/2001 | Adams |
| 6,315,308 B1 | 11/2001 | Konopka |
| 6,320,933 B1 | 11/2001 | Grodzins |
| 6,421,420 B1 | 7/2002 | Grodzins |
| 6,424,695 B1 | 7/2002 | Grodzins |
| 6,434,219 B1 | 8/2002 | Rothschild |
| 6,442,233 B1 | 8/2002 | Grodzins |
| 6,453,007 B2 | 9/2002 | Adams |
| 6,507,278 B1 | 1/2003 | Brunetti |
| 6,542,574 B2 | 4/2003 | Grodzins |
| 6,546,072 B1 | 4/2003 | Chalmers |
| 6,597,760 B2 | 7/2003 | Beneke |
| 6,621,888 B2 | 9/2003 | Grodzins |
| 6,665,373 B1 | 12/2003 | Kotowski |
| 6,952,163 B2 | 10/2005 | Huey |
| 7,092,485 B2 | 8/2006 | Kravis |
| 7,110,925 B2 | 9/2006 | Pendergraft |
| 7,317,390 B2 | 1/2008 | Huey |
| 7,397,892 B2* | 7/2008 | Linev .................. G01T 1/163 378/146 |
| 7,418,077 B2 | 8/2008 | Gray |
| 7,505,562 B2 | 3/2009 | Dinca |
| 7,551,715 B2 | 6/2009 | Rothschild |
| 7,551,718 B2 | 6/2009 | Rothschild |
| 7,555,099 B2 | 6/2009 | Rothschild |
| 7,660,388 B2 | 2/2010 | Gray |
| 7,796,733 B2 | 9/2010 | Hughes |
| 7,796,734 B2 | 9/2010 | Mastronardi |
| 7,809,109 B2 | 10/2010 | Mastronardi |
| 7,826,589 B2 | 11/2010 | Kotowski |
| 7,830,254 B2 | 11/2010 | Huey |
| 7,864,920 B2 | 1/2011 | Rothschild |
| 7,924,979 B2 | 4/2011 | Rothschild |
| 7,995,707 B2 | 8/2011 | Rothschild |
| 8,194,822 B2 | 6/2012 | Rothschild |
| 8,275,093 B2 | 9/2012 | Rothschild |
| 8,442,186 B2 | 5/2013 | Rothschild |
| 8,503,606 B2 | 8/2013 | Rothschild |
| 8,605,859 B2 | 12/2013 | Mastronardi |
| 8,842,808 B2 | 9/2014 | Rothschild |
| 8,861,684 B2 | 10/2014 | Al-Kofahi |
| 9,020,100 B2 | 4/2015 | Mastronardi |
| 9,099,279 B2 | 8/2015 | Rommel |
| 9,417,060 B1 | 8/2016 | Schubert |
| 9,466,456 B2 | 10/2016 | Rommel |
| 9,535,019 B1 | 1/2017 | Rothschild |
| 2003/0004792 A1 | 1/2003 | Townzen |
| 2003/0025302 A1 | 2/2003 | Urffer |
| 2003/0171939 A1 | 9/2003 | Yagesh |
| 2003/0214407 A1 | 11/2003 | Sweatte |
| 2003/0225612 A1 | 12/2003 | Desimone |
| 2003/0229506 A1 | 12/2003 | Scott |
| 2004/0051265 A1 | 3/2004 | Nadeau |
| 2004/0120454 A1 | 6/2004 | Ellenbogen |
| 2004/0252024 A1 | 12/2004 | Huey |
| 2005/0024199 A1* | 2/2005 | Huey .................. B64F 1/366 340/521 |
| 2008/0267350 A1 | 10/2008 | Gray |
| 2009/0141860 A1 | 6/2009 | Ryge |
| 2009/0200373 A1 | 8/2009 | Landwirth |
| 2010/0034451 A1 | 2/2010 | Hughes |

OTHER PUBLICATIONS

CRS Report for Congress, Aviation Security Technologies and Procedures: Screening Passengers and Baggage, Oct. 26, 2001, pp. 1-12.

International Search Report for PCT/US2010/049894, dated Dec. 30, 2010.

Extended European Search Report for EP10857609.1, dated May 17, 2017.

Examination Report for GB1307245.9, dated Jan. 19, 2017.

Examination Report for GB1307245.9, dated Jul. 4, 2017.

\* cited by examiner

AUTOMATED PERSONNEL SCREENING SYSTEM AND METHOD

FIELD OF THE INVENTION

The present invention relates generally to the field of X-ray screening and more specifically to systems and methods of managing the flow of people through personnel screening systems, which include X-ray based personnel screening systems, in order to optimize overall throughput and staffing needs.

BACKGROUND OF THE INVENTION

People screening systems, which can be X-ray, active millimeter wave, or passive millimeter wave based and metal detector systems, are deployed at transit points to detect contraband and threat items, such as weapons, explosives, and other dangerous objects concealed under clothing and within clothing. There exist a wide range of threat items, which are difficult to be automatically and conclusively detected by an automated algorithmic-based X-ray scanned image analysis system, leading to high false alarm rates.

In conventional systems, an operator is required to identify very low contrast objects. The difficulty of this task results in poor detection capability for a wide range of contraband and threats composed of low atomic number elements, such as plastics or ceramics, because they are often masked by the low atomic number elements that comprise the human body. Algorithmic-based image analyses such as edge detection or contour effects may be used for automatically and uniformly enhancing the image edges of low atomic number concealed objects to facilitate their detection. However, such edge enhancement is often accompanied with a simultaneous suppression of the edges of internal human anatomy that produce confusion in image interpretation.

However, a full body pat-down search is often time-consuming, resource-intensive, and uncomfortable for both the security personnel and the subject under inspection. The time consumed in performing full-body pat-downs further decreases throughput, thus making the process slow and inconvenient for other subjects who are in queue for security screening.

Accordingly, there is need for an integrated process for effectively managing the flow of people through various screening procedures, including a people screening system, such as, but not limited to, an automated people screening system, manual screening system, or an X-ray-based people screening system, operator intervention through scan image review, and pat-down search by security personnel in a way that optimizes overall throughput and staff requirements.

SUMMARY OF THE INVENTION

The present specification discloses a system for controlling a movement of at least one person into a controlled location, where the at least one person, in various embodiments is one of a single adult, a child capable of walking alone, an adult with a child that needs assistance walking, or a disabled adult with another adult assistant/caregiver that assists the disabled adult in walking or by pushing on the disabled adult's wheelchair comprising:
  A personnel screening system, such as an X-ray based screening system, having an entrance area defined by a plurality of walls and an exit area defined by a plurality of walls;
  A first gate having a first state and a second state wherein, in the first state, the first gate is open permitting entry of the at least one person into said entrance area and wherein, in the second state, the first gate is closed preventing entry of the at least one person into said entrance area;
  A second gate having a first state and a second state wherein, in the first state, the second gate is closed preventing the person from leaving the exit area and, in the second state, the second gate is open permitting the person to leave the exit area;
  A third gate having a first state and a second state wherein, in the first state, the third gate is closed preventing the person from leaving the exit area and, in the second state, the third gate is open permitting the person to leave the exit area and enter a holding area; and
  The X-ray screening system generates data, either automatically or manually, indicative of whether said person is carrying a prohibited object; and
  The data is used to automatically open at least one of said second gate or third gate.

Optionally, if said data is indicative of said person carrying a prohibited object, said X-ray screening system automatically transmits a signal to the third gate to open the third gate and permit the person to leave the exit area and enter the holding area. The X-ray screening system does not transmit a signal to the second gate to open the second gate if said third gate is being opened.

Optionally, if said data is not indicative of said person carrying a prohibited object, said X-ray screening system automatically transmits a signal to the second gate to open the second gate and permit the person to leave the exit area. The X-ray screening system does not transmit a signal to the third gate to open the third gate if said second gate is being opened.

The holding area is defined by a first wall, a second wall, the third gate, a fourth gate, and a fifth gate. In one embodiment, the fifth gate is a door. The fourth gate has a first state and a second state wherein, in the first state, the fourth gate is closed preventing the person from leaving the holding area and, in the second state, the fourth gate is open permitting the person to leave the holding area. The fifth gate has a first state and a second state wherein, in the first state, the fifth gate is closed preventing the person from leaving the holding area and, in the second state, the fifth gate is open permitting the person to leave the holding area and enter an inspection area. The data is communicated to a station for analysis by a remote screener. The remote screener indicates, using the station, where to look on the subject's body for the potential threat item.

In one embodiment, the data (indicative of the potential threat) is superimposed on an avatar (instead of over an X-ray image of the subject's body) to maintain privacy. United States Patent Publication Number 20100034451 and U.S. Pat. No. 7,796,733, both assigned to the assignee of the present invention, are herein incorporated by reference in their entirety. The station is configured to transmit a signal to said fourth gate or said fifth gate based upon receiving an input from said remote screener. The station transmits a signal, based upon an input from said person, to open said fourth gate, if said person determines that said data is not indicative of said person carrying a prohibited object. The station does not transmit a signal to the fifth gate to open said fifth gate if said fourth gate is being opened. The station transmits a signal, based upon an input from said person, to open said fifth gate, if said person determines that said data is indicative of said person carrying a prohibited object. The station does not transmit a signal to the fourth gate to open said fourth gate if said fifth gate is being opened. The inspection area is defined by a third wall, a fourth wall, and the fifth gate. At least one of said first gate, second gate, third gate, fourth gate, or fifth gate is partly controlled by a motion sensor.

In another embodiment, the system for controlling a movement of at least one person into a controlled location comprises an X-ray screening system having an entrance area defined by a first wall, a second wall, and a first gate and an exit area defined by a third wall, a fourth wall, a second gate and a third gate, wherein said X-ray screening system generates data indicative of objects being carried by said person; and a controller in data communication with said X-ray screening system wherein said controller automatically opens at least one of said second gate or said third gate based upon said data. If said data is indicative of said person carrying a prohibited object, said X-ray screening system automatically transmits a signal to the third gate to open the third gate and permit the person to leave the exit area and enter a holding area. If said data is not indicative of said person carrying a prohibited object, said X-ray screening system automatically transmits a signal to the second gate to open the second gate and permit the person to leave the exit area. The holding area is defined by a first wall, a second wall, the third gate, a fourth gate, and a fifth gate.

These, and other embodiments, will be further understood when considered in light of the detailed description read in combination with the drawings.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1A:
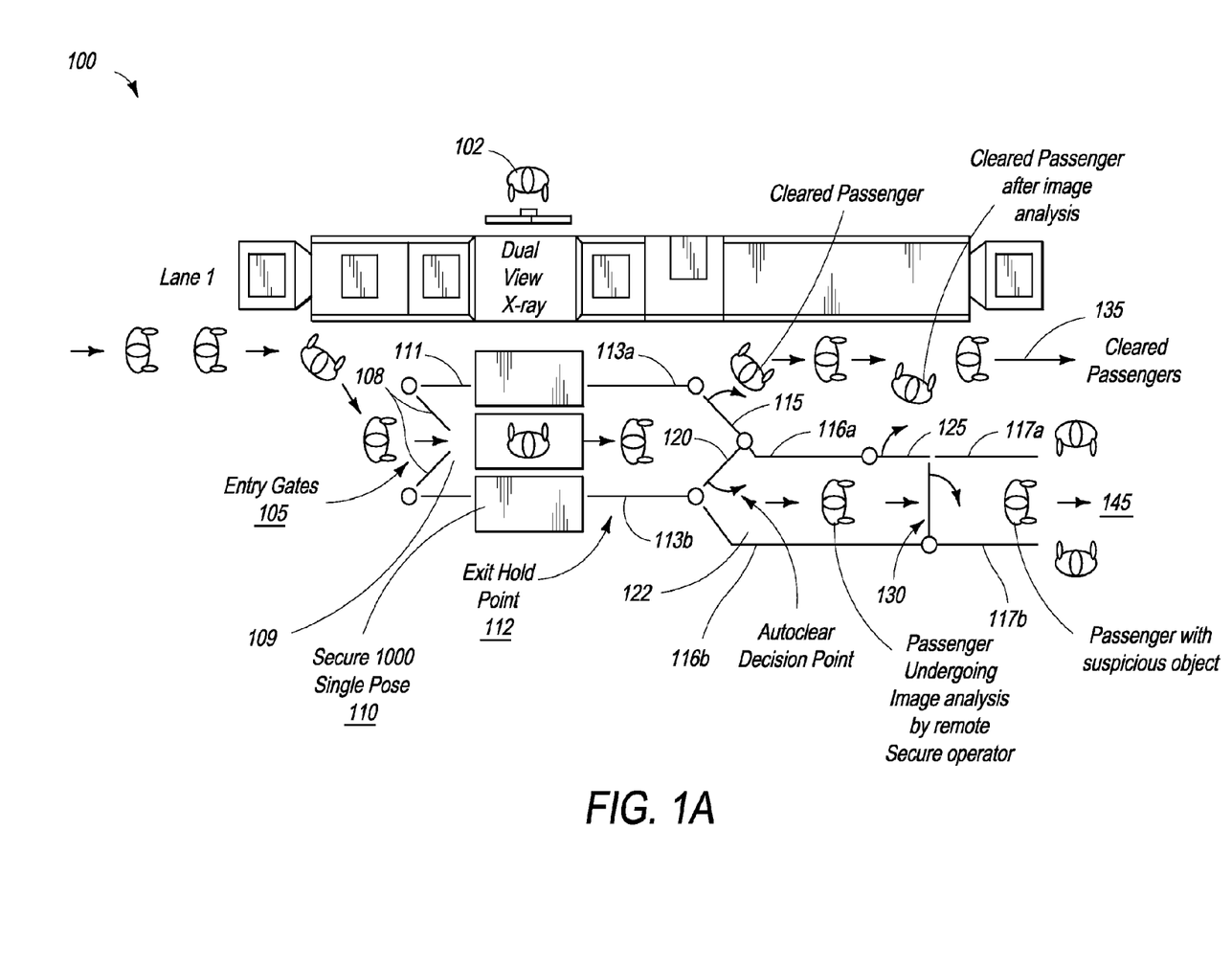
FIG. 1a shows an automated single-flow personnel screening system in accordance with one embodiment of the present invention.

FIG. 1a shows an automated single-flow personnel screening system 100 in accordance with one embodiment of the present invention. System 100 comprises a X-ray scanner 110 for scanning people along with a plurality of automated gates/doors positioned before and after the scanner 110 to guide and direct a flow of people through the system 100. In one embodiment, scanner 110 is a dual-sided backscatter X-ray people screening system such as the Rapiscan Secure 1000 Single Pose system commercially manufactured by the assignee of the present application. The people screening system can be any screening system capable of conducting an interrogation of a person and his or her belongings. Such screening systems can include any of the systems disclosed in U.S. Pat. Nos. 5,181,234; 6,094,472; 7,418,077; and 7,660,388; U.S. patent application Ser. Nos. 11/032,314; 12/262,631; 12/344,162; 12/024,320; 12/142,978; and U.S. Provisional Patent Application Nos. 61/313,773; 61/313,772; 61/261,818; and 61/262,176, which are all incorporated herein by reference in their entirety.

In one embodiment, system 100 is capable of managing a single stream of people and comprises at least three automated gates/doors to direct the flow of personnel. In one embodiment, the automated gates/doors comprise a first gate 105 situated prior to the scanner 110 that acts to create, in combination with side walls 111 an entry area 109 to the system 100 ensuring, for example, that only one person at a time enters the scanner 110. Gate 105 opens when a person approaches and then closes when the person passes the open gate 105, remaining closed at least while the person is being scanned. Second and third gates 115, 120, respectively, are located immediately after the scanner 110 to direct the person, who is held in hold area 112 post scan, in one of two different areas 135 or 122 based on the outcome of automatic scan. Optional fourth and fifth gates 125, 130, located further downstream from the scanner 110, direct the scanned person, who is held in hold area 122, in one of two different directions 135 or 145, respectively. An operator 102 can view scanned image, from scanner 110, to ascertain if the image scan is benign or comprises anomaly—in case the system 100 is unable to automatically provide clearance to the person. In one embodiment, the operator 102 is presented with an avatar (instead of an actual X-ray image of the scanned person comprising anatomical details) with anomaly, if present, superimposed on the avatar. The use of the avatar allows for maintaining of the scanned person's privacy.

It should be appreciated that the gates 105, 115, 120, 125, 130 can be structured or configured using any form of door or gate. In one embodiment, gate 105 comprises two panels 108, which are a left panel and a right panel, that open and close in a coordinated fashion. The panels 108 are hinged to side walls 111 that extend from each of the gate panels 108 to X-ray scanner 110 to create an enclosed area 109. In one embodiment, the gate 105 opens automatically a) based upon a signal received from an infrared sensor, or other type of motion sensor, that determines when a person is sufficiently physically proximate to the gate panels 108 and b) if the system 100 indicates that another person is not in the personnel X-ray scanner 110 and, optionally, not in the exit hold area 112. The gate 105 can then automatically close once a motion sensor detects the person has passed into entry area 109. In another embodiment, the gate 105 can be a unitary structure (made of a large single panel), can be a rotating or revolving door, can be solid, can be transparent, or can be made of any material known to persons of ordinary skill in the art.

In one embodiment, gate 120 and gate 115 each comprise a single panel that opens and closes in a coordinated manner. Gate 115 meets left side wall 113a, which extends from the X-ray scanner 110 to create a first portion of the enclosed area 111. Similarly, gate 120 meets right side wall 113b that extends from the personnel X-ray scanner 110 to create a second portion of the enclosed area 111. Gates 120 and 115 are preferably both hinged to a common location which is physically part of, or attached to, left side wall 116. The common hinge point enables gate 120 and gate 115 to both open out and away from exit area 112, specifically in pathway 135 and into hold area 122, thereby avoiding opening inward and potentially hitting a person standing in exit area 112 and avoiding opening and hitting each other. To ensure traffic flow is properly directed, only one of gates 115, 120 is open at any given time. Either of gate 115 or gate 120 opens preferably in response to an automatically generated or manually generated signal, as further described below.

The left wall 113a, gate 115, wall 116a, gate 125, and wall 117a form a contiguous enclosure, when the gates are closed. Similarly, the right wall 113b, gate 120, wall 116b, gate 130, and wall 117b form a contiguous enclosure, when the gates are closed. Gate 125 is hinged to wall 116a and preferably opens away from hold area 122 into traffic flow area 135. Gate 130 is hinged to either wall 116b or 117b and preferably opens away from hold area 122 into traffic flow area 145.

Figure 1B:
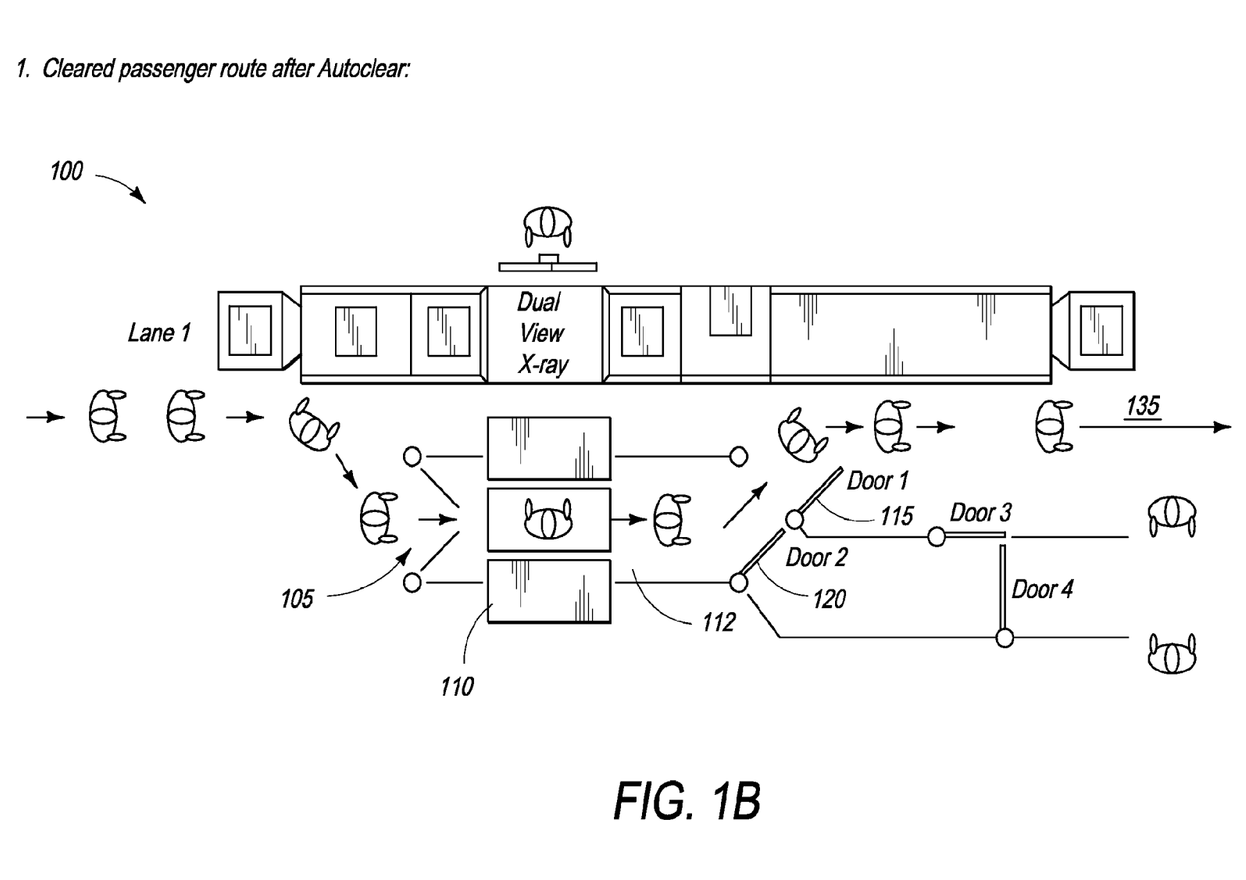
FIG. 1b shows the personnel screening system of the present invention, as shown in FIG. 1a, in operation, wherein a person being screened is auto-cleared out of the system.

Referring now to FIG. 1b, during operation, as a person enters system 100, he approaches the first gate 105 that automatically opens when the person is in proximity to the gate 105 (provided no other person is in the X-ray screening system 110 or, optionally, exit hold area 112), allowing the person to enter and then automatically closes behind him while the person is being scanned by the scanner 110. Post scan, the person steps into hold area 112 while the scanner 110 processes the image scan. In one embodiment, at this stage, the processing of the image scan of the person is solely algorithm-based, without requiring any operator intervention, thereby resulting in an automated clear or no-clear outcome from the scanner 110. In case of the scanner 110 generating an automated clear result, a signal is transmitted, in a wired or wireless fashion, to the second gate 115 to thereby cause a motor to automatically open gate 115, keeping the third gate 120 closed. This permits a person in exit area 112 to exit to clearance area 135 from where he is free to exit the entire system 100.

Figure 1C:
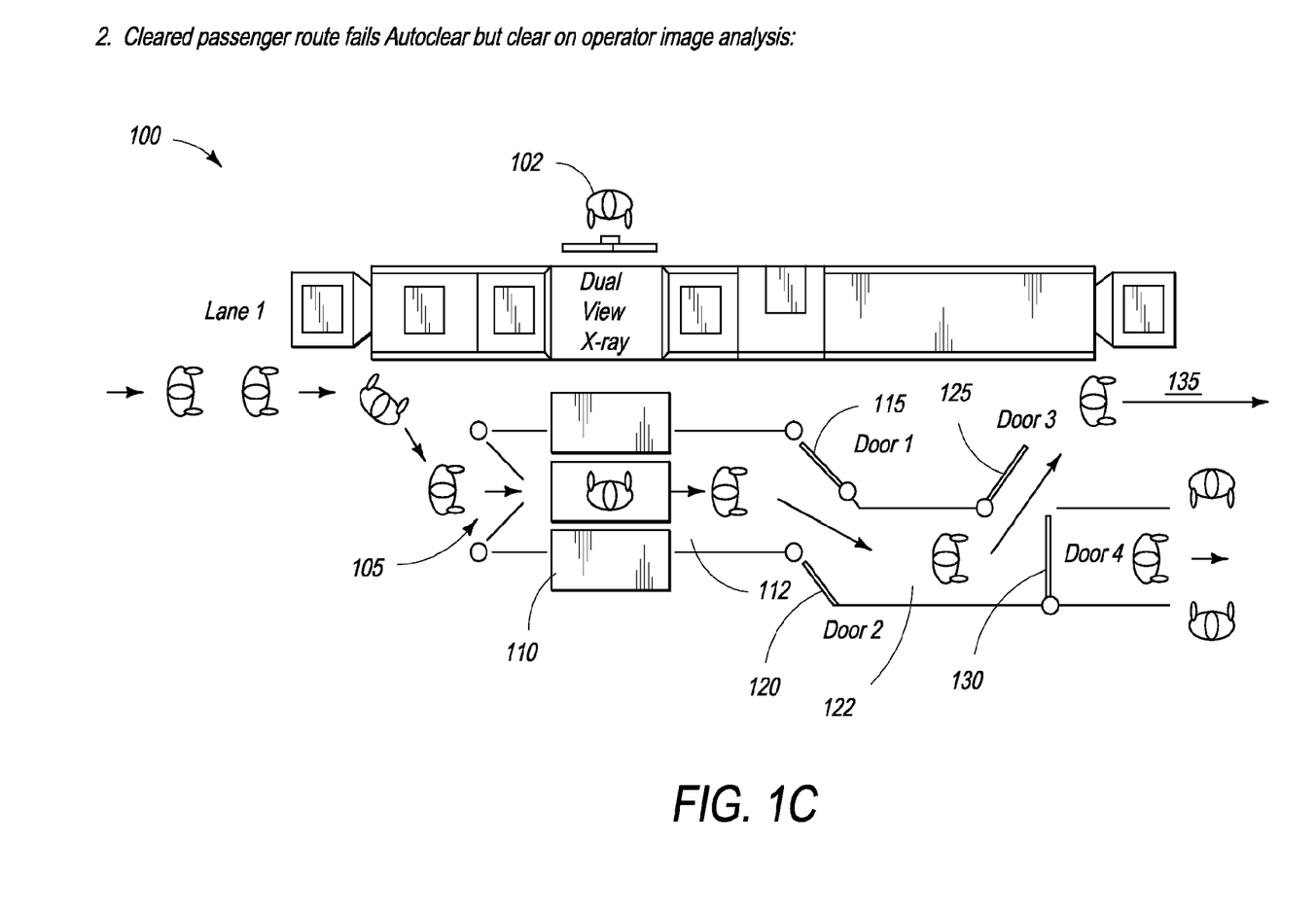
FIG. 1c shows the personnel screening system of the present invention, as shown in FIG. 1a, in operation, wherein a person being screened is cleared out of the system by an operator, after having failed the auto-clear step.

However, if the scanning system does not automatically generate a clear signal and, instead, generates a no clear signal, (because, for example, the scanner 110 has identified an anomaly), then a signal is transmitted, in a wired or wireless fashion, to the gate 120 to thereby cause a motor to automatically open gate 120, keeping the gate 115 closed, and the person is directed into hold area 122, as shown in FIG. 1c. This permits a person in exit area 112 to exit into hold area 122. It should be appreciated that, after a user passes any gate, a motion sensor senses the user has past the gate and causes the gate to return to a closed position, which is a default position or first position in the system 100. It is expected that the system will process individuals in a pipeline fashion, permitting more than one adult person to enter the system at a time but only permitting one adult person to be in one defined holding area at one time. In one embodiment, one adult person and one child that must be accompanied by an adult when walking through the screening system can be in one defined holding area at one time, but not more than one adult. In another embodiment, a disabled adult person and a caregiver or another adult assistant that must accompany the disabled adult when walking (or, say, being pushed on a wheelchair) can be in one defined holding area at one time, but not more than two adults. It should also be appreciated that the system ensures that people are singulated when passing through the system of the present invention. In one embodiment, the holding areas are bomb proof thereby effectively enabling singulation of persons carrying threats.

Once the gate 120 opens and the user moves to hold area 122, an X-ray screening operator 102 reviews the scan image(s) of the person. In one embodiment, the scanned image provided to the operator for review is marked or annotated for areas of anomaly. In another embodiment, an avatar, marked or annotated for areas of anomaly, is presented to the operator for review. If the operator 102 finds that the anomaly, due to which the scanner system 100 had not given an auto-clear, is benign then the operator causes a signal to be transmitted, in a wired or wireless fashion, to gate 125 to thereby cause a motor to open gate 125, keeping gate 130 closed. This directs the person from area 122 into the clearance area 135 where he is free to exit the system 100, as shown in FIG. 1c.

Figure 1D:
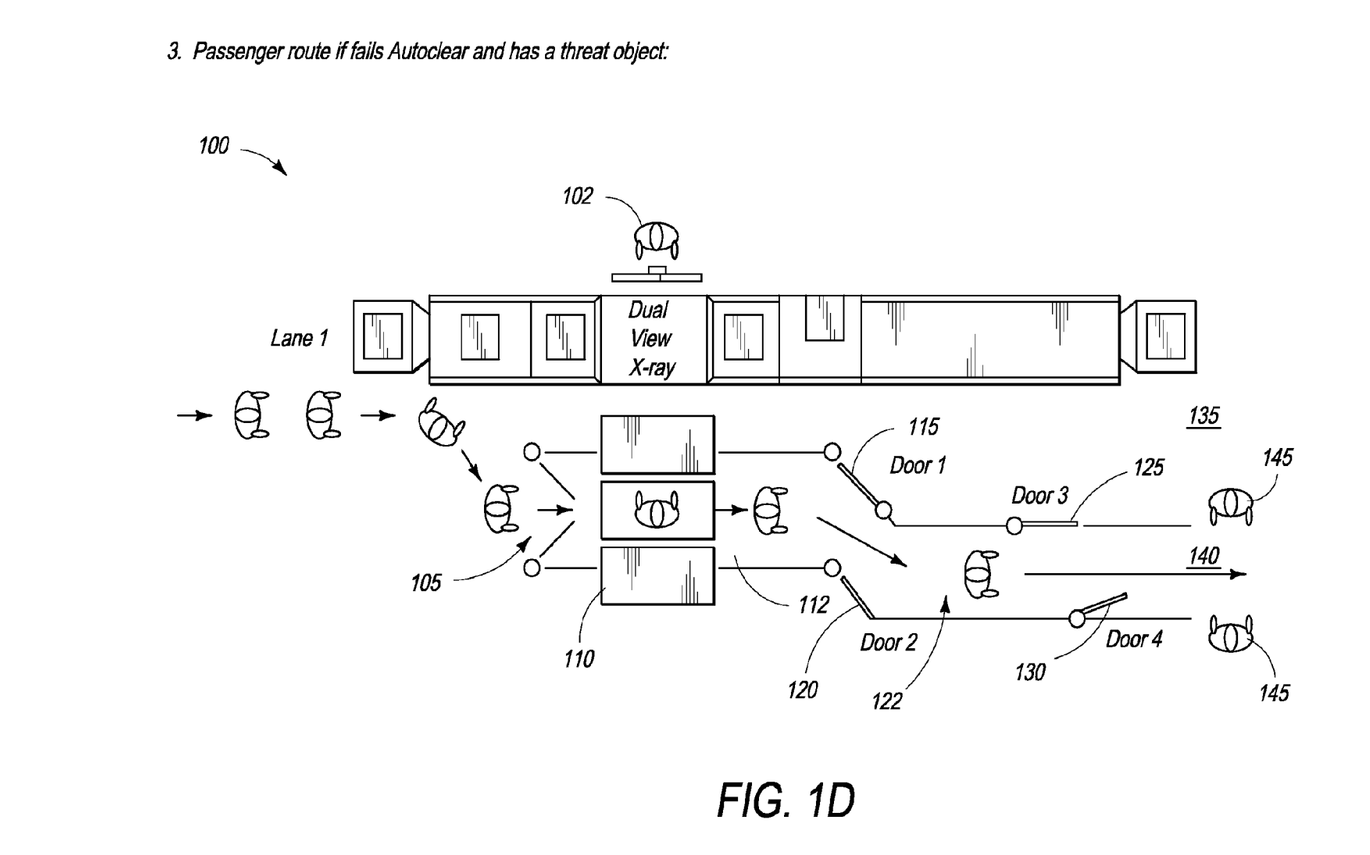
FIG. 1d shows the personnel screening system of the present invention, as shown in FIG. 1a, in operation, further showing the route of a person being screened after having failed both the auto-clear step and operator clearance.

However, if during the review of the scan image(s) the operator 102 detects a threat, then instead of causing a signal to be transmitted, in a wired or wireless fashion, to gate 125 to thereby cause a motor to open gate 125, the operator causes a signal to be transmitted, in a wired or wireless fashion, to gate 130 to thereby cause a motor to open gate 130, keeping gate 125 closed. This directs the person towards area 140 where security personnel 145 conduct a further physical search of the person, as shown in FIG. 1d. In one embodiment, the further physical search of the person includes a thorough search of the area in question. First, the person under inspection will be asked to remove the suspicious item and show it to the operator. Then, the place on the subject's body where the item was located is then subject to a limited area pat-down. In another embodiment, the further physical search includes a full hand/pat-down search of the entire person.

Persons of ordinary skill in the art should note that the operator 102 in one embodiment is stationed within or in proximity to the system 100. In alternate embodiments, the operator 102 is stationed remotely from the system 100 and is able to communicate with system 100 through wired and/or wireless network, as would be evident to those of ordinary skill in the art. Also, to further improve the overall throughput of the system 100, people to be screened are appropriately pipelined, in one embodiment.

Figure 2:
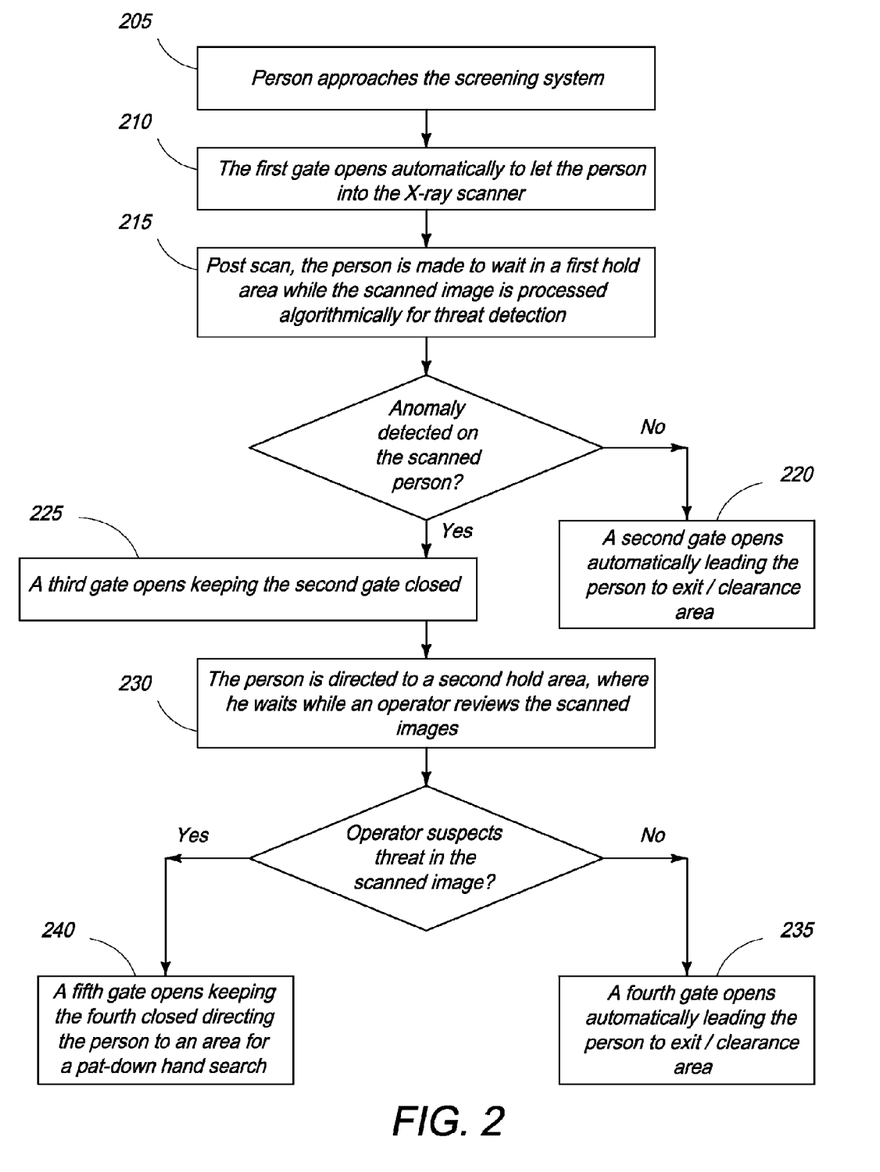
FIG. 2 is a flow chart describing a method of managing screening of people in accordance with an embodiment of the present invention.

FIG. 2 is a flow chart describing a method of managing screening of people in accordance with an embodiment of the present invention. As a person approaches 205 the system 100 of FIG. 1a, a first gate automatically opens 210 thereby letting him into an entry area and the X-ray scanner. The first gate closes behind the person while the scanning system is on. After the scan, the person is made to wait 215 at a first hold area to allow for the scanner to algorithmically process and analyze the scanned images for potential threats. If the person is found to have no suspicious threats, a second gate opens 220 automatically leading the person to a clearance area. However, in case of anomaly a third gate opens 225 instead, keeping the second gate closed, directing the person to wait 230 at a second hold area while an operator reviews the scanned images or an avatar marked/annotated for areas of potential anomaly. If the operator finds the anomaly to be benign a fourth gate opens 235 leading the person to the clearance/exit area. However, if the operator is unable to take a clear decision by reviewing the scan images and suspects an anomaly then a fifth gate opens 240, keeping the fourth gate closed, leading the person to another area where a pat-down hand search is conducted by security personnel.

Figure 3:
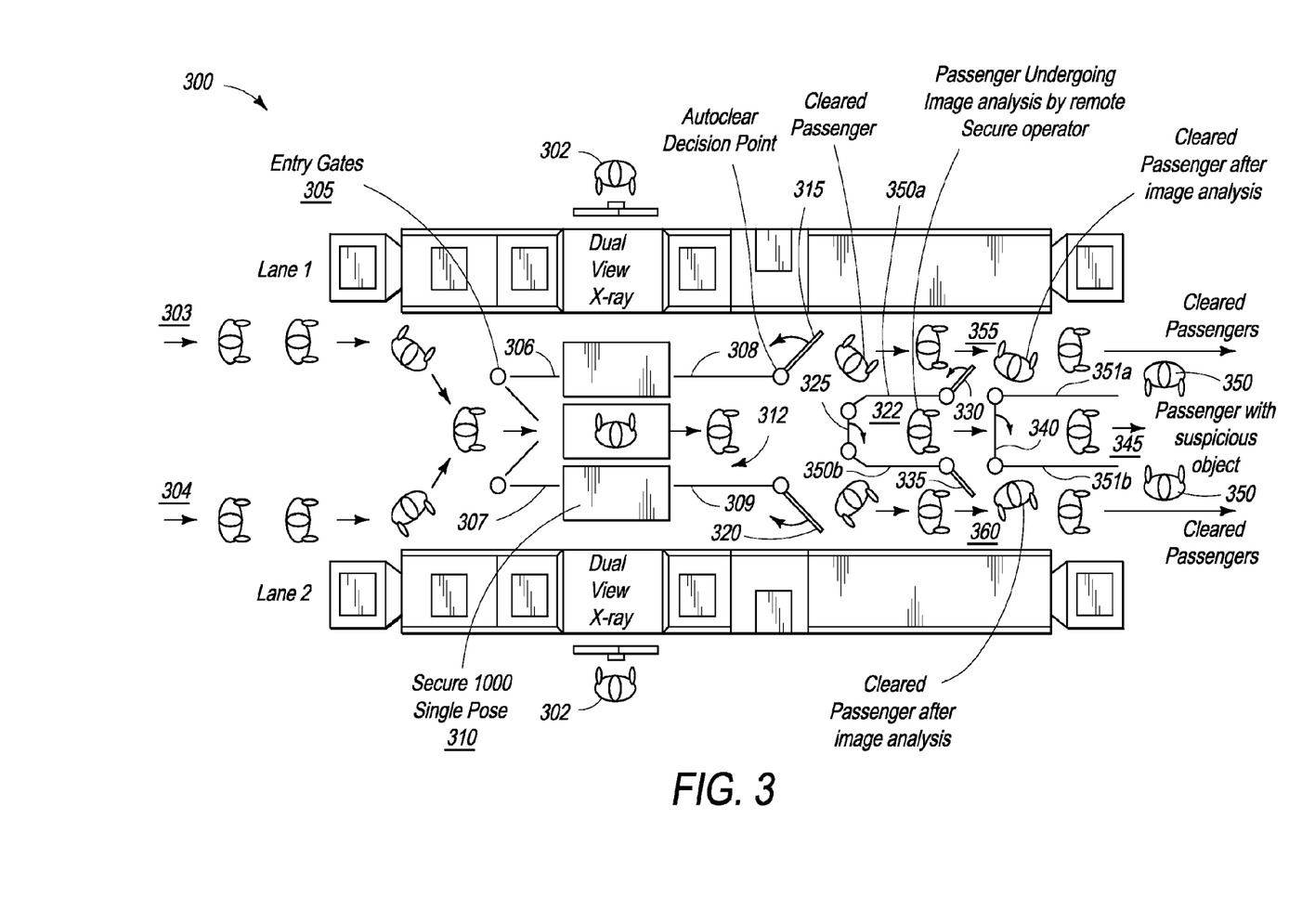
FIG. 3 shows an automated dual-flow personnel screening system, during operation, in accordance with another embodiment of the present invention.

FIG. 3 shows an automated dual-flow personnel screening system 300 in accordance with another embodiment of the present invention. System 300 comprises a people X-ray scanner 310 along with a plurality of automated gates/doors before and after the scanner to guide and direct people who approach the system 300 in two streams or pipelines 303, 304. In one embodiment, the scanner 110 is a dual-sided backscatter X-ray people screening system such as the Rapiscan Secure 1000 Single Pose system commercially manufactured by the assignee of the present application.

In one embodiment, system 300 comprises seven automated gates/doors to direct the flow of two streams or pipelines 303, 304 of people. These automated gates/doors comprise a first gate 305 situated prior to the scanner 310 and acts as an entry point to the system 300. As described above, the first gate 305 ensures that only one person, from one of the two streams or pipelines 303, 304, at a time enters the scanner 310 such that the gate 305 opens when a person approaches and closes behind while the person is being scanned. Post scan, the scanned person is held in area 312 while the system 300 automatically processes the image scan for threat detection. If the scan image processing indicates that there is no threat or anomaly then an auto-clear signal is generated. This causes second and third gates 315, 320 located immediately after the scanner 310 to open thereby directing the person, who was waiting in hold area 312 post scan, in any one of two directions 355, 360 leading to a clearance or exit.

However, if the automatic image scan process does not result in an auto-clear signal, fourth gate 325 opens (keeping second and third gates 315, 320 closed) directing the scanned person to move to area 322. While the person is held in area 322, one of the two operators 302 views and analyses the person's scanned image to ascertain anomaly. In one embodiment, the scanned image provided to the operator for review is marked or annotated for areas of anomaly. In another embodiment, an avatar, marked or annotated for areas of anomaly, is presented to the operator for review. Persons of ordinary skill in the art should note that the scanned image of the person can be directed to any one of the two operators 302 depending, in one embodiment, on a predetermined alternating sequence or, in another embodiment, simply depending on which operator has fewer number of image scans queued for analysis. If the operator determines that the anomaly is benign then the operator signals fifth and sixth gates 330, 335 to open thereby directing the person to move in any one of two directions 355, 360 leading to a clearance or exit. However, if the operator determines that the anomaly is likely to be a threat then the operator signals seventh gate 340 to open (keeping the fifth and sixth gates 330, 335 closed) thereby directing the person to area 345 where security personnel 350 conduct a hand/pat-down search of the person.

In one embodiment, the system 300 is structured as a series of walls and gates that create a plurality of staged enclosures. A left side of the plurality of staged enclosures is created by a left panel of gate 305, which is hinged to wall 306 that extends to X-ray screening system 310, thereby creating the left portion of an entry area. Wall 308 extends out from X-ray screening system 310 to gate 315, which is hinged thereto and opens outward into traffic flow area 355. When closed, gate 315 meets the point at which gate 325 meets wall 350a when closed and forms the left portion of exit area 312. Gate 330 is connected to, or hinged to, wall 350a, thereby forming the left portion of hold area 322. Gate 330 opens outward into traffic flow area 355. When closed, gate 330 meets wall 351a, which forms the left portion of pathway 345.

Similarly, a right side of the plurality of staged enclosures is created by a right panel of gate 305, which is hinged to wall 307 that extends to X-ray screening system 310, thereby creating the right portion of an entry area. Wall 309 extends out from X-ray screening system 310 to gate 320, which is hinged thereto and opens outward into traffic flow area 360. When closed, gate 320 meets the hinge point connecting door 325 to wall 350b and forms the right portion of exit area 312. Gate 335 is connected to, or hinged to, wall 350b, thereby forming the right portion of hold area 322. Gate 335 opens outward into traffic flow area 360. When closed, gate 335 meets the hinge point connecting gate 340 to wall 351b, which forms the right portion of pathway 345. Gate 340 opens outward, away from hold area 322 into traffic area 345.

In one embodiment, the system 300 also comprises a plurality of CCTV cameras that provide video feeds, of the streams 303, 304 of people, to operators 302 to monitor and effectuate opening of appropriate exit gates all the way along the system 300.

Various changes could be made in the above constructions without departing from the scope of the invention, therefore, it is intended that all matter contained in the above description should be interpreted as illustrative and not as limiting. In particular, it should be appreciated that various forms of gates, doors, walls, enclosure structures, motorized gates, and data signals can be used to achieve the controlled traffic flow described herein.

I claim:

1. An X-ray screening system positioned to control a flow of people to a secured area from an unsecured area comprising at least:
   a scanner; a scanning enclosure defined by a plurality of walls, a first gate, a second gate, and a third gate, the scanning enclosure comprising a scanning area for scanning an individual, wherein the plurality of walls comprises a first wall positioned in the unsecured area and having a proximal end and a distal end connected to the scanner, a second wall positioned in the secured area and having a proximal end connected to a first side of the scanner and a distal end, and a third wall positioned in the secured area and having a proximal end connected to a second side of the scanner opposing the first side and a distal end;
   the first gate coupled with the proximal end of the first wall configured to open to allow the individual to enter into the scanning area;

the second gate coupled with the distal end of the second wall configured to allow the individual to exit the X-ray screening system if a clear signal is generated by the screening system after completing a scan, the second gate remaining closed if the first gate is open and the first gate remaining closed if the second gate is open; and the third gate coupled with the distal end of the third wall configured to allow the individual to exit to a holding enclosure for inspection if a no-clear signal is generated by the system after completion of the scan, wherein the holding enclosure is defined by at least two walls and two gates, wherein the clear and no-clear signals are generated based on outcomes of the scan, wherein the second gate remains closed if a no-clear signal is generated, and wherein if the first gate is open, only one of the second and the third gates is open concurrently.

2. The screening system as claimed in claim 1 wherein the scanning enclosure further comprises a hold area for holding the individual during analysis of images captured during the scan, wherein the second gate allows the individual to exit the hold area upon completion of the analysis if the analysis does not result in a threat detection.

3. The screening system as claimed in claim 2 wherein one or more computer implemented processes are used to analyse the scan images, while the individual is in the hold area.

4. The screening system as claimed in claim 2 further comprising a fourth gate coupled with one of the plurality of walls configured to allow the individual to exit from the holding enclosure to an inspection area for manual inspection, if the analysis results in a threat detection.

5. The screening system as claimed in claim 2 further comprising a fifth gate coupled with one of the plurality of walls configured to allow the individual to exit the screening system if the analysis of the scan images does not result in a threat alarm.

6. The screening system as claimed in claim 1 wherein a signal is transmitted to open the second gate and close the third gate if a clear signal is generated by the screening system after completing the scan.

7. The screening system as claimed in claim 1 wherein a signal is transmitted to open the third gate and close the second gate if a no-clear signal is generated by the system after completing the scan.

8. The screening system as claimed in claim 1 wherein at least one of the first, second and third gates comprise a left panel and a right panel opening and closing in coordination, each of the panels being hinged to walls defining the scanning enclosure.

9. The screening system as claimed in claim 1 wherein the first gate opens automatically based upon a signal received from a sensor sensing an individual being within a predefined distance of the first gate and if the scanning enclosure does not contain one or more individuals.

10. The screening system as claimed in claim 1 wherein at least one of the first, second and third gates comprises a rotating door or a revolving door.

* * * * *